(12) United States Patent
Kirchmeyer et al.

(10) Patent No.: US 7,402,651 B2
(45) Date of Patent: Jul. 22, 2008

(54) MACROMOLECULAR COMPOUNDS WITH A CORE-SHELL STRUCTURE

(75) Inventors: Stephan Kirchmeyer, Leverkusen (DE); Sergei Ponomarenko, Moskau (RU); Aziz Muzafarov, Moskau (RU)

(73) Assignee: H.C. Starck GmbH & Co. KG, Coslar (DE)

( * ) Notice: Subject to any disclaimer, the term of this patent is extended or adjusted under 35 U.S.C. 154(b) by 385 days.

(21) Appl. No.: 11/088,434

(22) Filed: Mar. 24, 2005

(65) Prior Publication Data
US 2005/0215760 A1 Sep. 29, 2005

(30) Foreign Application Priority Data
Mar. 25, 2004 (DE) .................. 10 2004 014 621

(51) Int. Cl.
*C08G 75/00* (2006.01)
*C08G 77/00* (2006.01)
*C08G 77/50* (2006.01)
*C08G 83/00* (2006.01)
*H01B 1/12* (2006.01)

(52) U.S. Cl. ................... 528/373; 528/86; 257/40; 257/642

(58) Field of Classification Search ............ 528/86, 528/373; 257/40, 642
See application file for complete search history.

(56) References Cited

U.S. PATENT DOCUMENTS 6,025,462 A 2/2000 Wang et al.

7,078,724 B2 * 7/2006 Kirchmeyer et al. .......... 257/40

FOREIGN PATENT DOCUMENTS

| EP | 1 219 666 A2 | 7/2002 |
|---|---|---|
| EP | 1 398 341 A2 | 3/2004 |
| WO | WO 01/59030 A1 | 8/2001 |
| WO | WO 2004/009669 A1 | 1/2004 |

OTHER PUBLICATIONS

Young H. Kim et al; "Hyperbranched Polyphenylenes"; Macromolecules, vol. 25, No. 21; pp. 5561-5572; American Chemical Society (1992).

Caiguo Gong, et al; "End functionalization of hyperbranched poly(siloxysilane): novel crosslinking agents and hyperbranched-linear star block copolymers"; Journal of Polymer Science—part A-Polymer Chemistry, vol. 38, pp. 2970-2978, Wiley & Sons, Inc. (2000) (XP-002259197).

Jean-Pierre Majoral et al; "Dendrimers containing heteroatoms (Si, P, B, Ge, or Bi)"; Chemical Reviews (1999), vol. 99, pp. 845-880 (XP-002338180).

The European Search Report.

* cited by examiner

*Primary Examiner*—Duc Truong
(74) *Attorney, Agent, or Firm*—Norris McLaughlin & Marcus PA

(57) ABSTRACT

Macromolecular compounds having a core-shell structure are described. Also described is a process for preparing such macromolecular compounds, and their use as semiconductors in electronic structural elements.

21 Claims, No Drawings

MACROMOLECULAR COMPOUNDS WITH A CORE-SHELL STRUCTURE

CROSS REFERENCE TO RELATED PATENT APPLICATION

The present patent application claims the right of priority under 35 U.S.C. §119(a)-(d) of German Patent Application No 102004014621.7, filed Mar. 25, 2004.

FIELD OF THE INVENTION

The invention relates to macromolecular compounds that have a core-shell structure, a process for their production and their use as semiconductors in electronic structural elements.

BACKGROUND OF THE INVENTION

The field of molecular electronics has developed rapidly over the past 15 years with the discovery of organic conducting and semiconducting compounds. Over this period, a large number of compounds has been discovered, that have semiconducting or electro-optic characteristics. It is generally understood, that molecular electronics will not displace conventional, silicon-based semiconductor building blocks. Instead, it is assumed that molecular electronic structural elements will open up new applications in which suitability for coating large areas, structural flexibility, processability at low temperatures and low costs are required. Semiconducting organic compounds are currently used for applications such as organic field effect transistors (OFETs), organic light-emitting diodes (OLEDs), sensors and photovoltaic elements. By simple structuring and integration of OFETs into integrated organic semiconductor switches, cost-effective solutions become possible for intelligent cards (smart cards) or price labels, which it has so far been impossible to realise using silicon technology because of the price and the inflexibility of silicon building blocks. Equally, OFETs could be used as switch elements in large-scale flexible matrix displays. A summary of organic semiconductors, integrated semiconductor switches and their use is given for example in Electronics 2002, Volume 15, p. 38.

A field effect transistor is a tri-electrode element, in which the conductivity of a thin conducting channel between two electrodes (called the 'source' and the 'drain') is controlled by a third electrode (called the 'gate'), separated from the conducting channel by a thin insulating layer. The most important characteristic properties of a field effect transistor are the mobility of the charge carrier, which is decisive in determining the switching speed of the transistor and the ratio of the currents when switched on and when switched off, known as the 'on/off ratio'.

Two major classes of compound have been used hitherto in organic field effect transistors. All of the compounds have long conjugated units and are sub-divided into conjugated polymers and conjugated oligomers, depending on their molecular weight and structure.

In general, oligomers have a uniform molecular structure and a molecular weight below 10000 Dalton. Polymers generally consist of chains of uniform repeating units with molecular weight distribution. However, there is a continuous transition between oligomers and polymers.

When distinguishing between oligomers and polymers, it is often said that there is a fundamental distinction in the processing of these compounds. Oligomers are often evaporable and are applied to substrates by vapour deposition processes. Compounds that are no longer evaporable and must thus be applied by a different process are often described as polymers irrespective of their molecular structure. With polymers, the aim is generally to produce compounds that are soluble in a liquid medium, for example organic solvents, and can then be applied by corresponding application processes. A very common application process is e.g. 'spin-coating'. The application of semiconducting compounds by the Ink-Jet process is a particularly elegant method. In this process, a solution of the semiconducting compound is applied to the substrate in the form of very fine droplets and dried. This process allows structuring to be carried out during application. A description of this application process for semiconducting compounds is given for example in Nature, Volume 401, p. 685.

In general, greater potential is attributed to the wet chemical process for obtaining low-cost organic integrated semiconductor switches by simple means.

An important prerequisite for the production of high-quality organic semiconductor circuits is compounds of extremely high purity. Ordering phenomena play an important role in semiconductors. The inhibition of uniform alignment of the compounds and marking of grain boundaries leads to a dramatic fall in semiconductor properties, so that organic semiconductor circuits built using compounds that are not of extremely high purity are generally unusable. Remaining impurities may, for example, inject charges into the semiconducting compounds ('doping') and thus reduce the on/off ratio or act as charge traps and thus drastically reduce mobility. Furthermore, impurities may initiate a reaction of the semiconducting compounds with oxygen and impurities with an oxidising action may oxidise the semiconducting compounds and thus reduce possible storage, processing and operating times.

The purities generally needed are so high, that they generally cannot be achieved by the known processes of polymer chemistry such as washing, reprecipitation and extraction.

Oligomers, on the other hand, which are often volatile compounds of a uniform molecular structure, can be purified relatively simply by sublimation or chromatography.

Some important examples of semiconducting polymers are described below. For polyfluorenes and fluorene copolymers, for example poly(9,9-dioctylfluorene-co-bithiophene) (I)

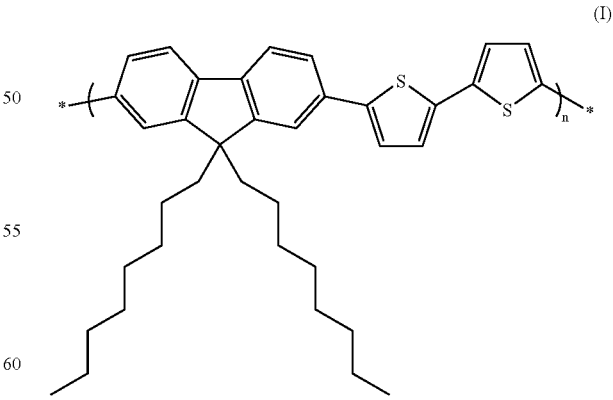

(I)

charge mobilities, abbreviated below also to mobilities, up to 0.02 cm$^2$/Vs were achieved (Science, 2000, Volume 290, p. 2123), with regioregular poly(3-hexylthiophene-2,5-diyl) (II)

(II)

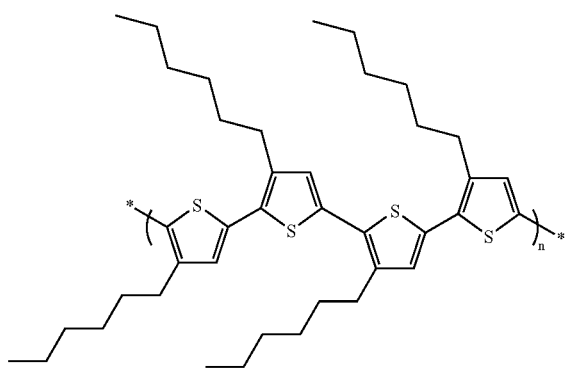

even mobilities up to 0.1 cm²/Vs (Science 1998, Volume 280, p. 1741). Like almost all other long-chain polymers, polyfluorene, polyfluorene copolymers and poly(3-hexylthiophene-2,5-diyl) form good films after application from solution and are therefore easy to process. However, as high-molecular weight polymers with molecular weight distribution, they cannot be purified by vacuum sublimation and are difficult to purify by chromatography.

Important representatives of oligomeric semiconducting compounds are, for example, oligothiophenes, in particular those with terminal alkyl substituents according to formula (III)

(III)

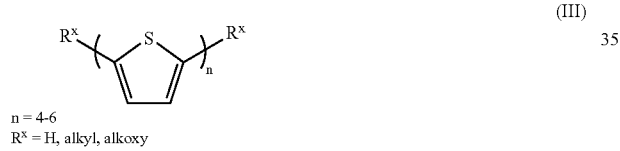

n = 4-6
$R^x$ = H, alkyl, alkoxy and pentacene (IV)

(IV)

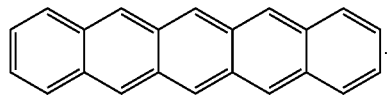

Typical mobilities for e.g. α,α'-dihexylquarter-, -quinque- and -sexithiophene are 0.05-0.1 cm²/Vs.

Mesophases, in particular liquid crystalline phases, appear to play a particular role in semiconducting organic compounds, which the persons skilled in the art have so far not completely understood. For example, the maximum mobility has so far been reported for crystals of α,α'-dihexylquarterthiophenes (Chem. Mater., 1998, Volume 10, p. 457), which crystallise at a temperature of 80° C. from an enantiotropic liquid crystalline phase (Synth. Met., 1999, Volume 101, p. 544). Particularly high mobilities can be obtained by using individual crystals, e.g. a mobility of 1.1 cm²/Vs was disclosed for individual crystals of α,α'-sexithiophene (Science, 2000, Volume 290, p. 963). If oligomers are applied from solution, there is mostly a sharp drop in mobility.

In general, the drop in semiconducting properties during processing of oligomeric compounds from solution is caused by the moderate solubility and low film-forming tendency of the oligomeric compounds. Thus inhomogeneities are caused for example by precipitation during drying from the solution (Chem. Mater., 1998, Volume 10, p. 633).

Attempts have therefore been made to combine the good processing and film-forming properties of semiconducting polymers with the properties of semiconducting oligomers. Patent specification U.S. Pat. No. 6,025,462 discloses conductive polymers with a star structure, which consist of a branched core and a shell of conjugated side groups. However, these have some disadvantages. If the side groups are formed from laterally unsubstituted conjugated structures, the resulting compounds are insoluble, or not readily soluble, and cannot be processed. If the conjugated units are substituted with side groups, although this leads to improved solubility, the steric requirements of the side groups cause internal disorientation and morphological defects, which impair the semiconducting properties of these compounds.

The laid open specification WO 02/26859 A1 discloses polymers of a conjugated reverse wheel to which aromatically conjugated chains are attached. The polymers bear diarylamine side groups, which allow electron conduction. However, as these compounds are based on diarylamine side groups, they are unsuitable as semiconductors.

The laid open specification EP-A 1 398 341 discloses semiconducting dendrimers, which can be processed from solution.

However, further improved compounds are needed, which combine the semiconducting properties of known oligomers with the processability and good film-forming properties of known polymers.

SUMMARY OF THE INVENTION

The object of the invention is to provide further organic compounds, which can be processed from common solvents and have good semiconducting properties. Such organic semiconducting compounds would be extremely suitable for the coating of large areas.

It would be particularly desirable if the compounds formed high-quality layers of uniform thickness and morphology and were suitable for electronic applications.

It was found, surprisingly, that organic compounds have the desired properties, if they have a core-shell structure containing a core constructed of multifunctional units and a shell of binding chains and linear conjugated oligomeric chains, which are each saturated on the terminal point of linkage by a flexible non-conjugated chain.

The invention provides macromolecular compounds with a core-shell structure, the core (K) having a macromolecular base structure based on silicon and/or carbon and being bound with at least 3, in particular with at least 6, outer atoms by means of a binding chain (V) based on carbon with linear oligomeric chains (L) based on carbon with continuously conjugated double bonds, wherein the conjugated chains (L) are each saturated with a further, in particular aliphatic, araliphatic or oxyaliphatic chain (R) without conjugated double bonds, at the opposite end to the binding chain (V).

In accordance with the present invention, there is more particularly provided, a macromolecular compound, having a core-shell structure, comprising, (i) a core comprising a macromolecular base structure comprising atoms selected from the group consisting of silicon and carbon and combinations thereof, said core being bound to at least 3 outer groups by means of, for each outer group, (ii) a binding chain based on carbon, each binding chain being bound to said core and also being bound to (iii) a first end of a conjugated chain (L) comprising a linear carbon-based oligomeric chain having continuously conjugated double bonds, (iv) a further chain that is bound to an end of said conjugated chain (L) that is opposite of said first end of said conjugated chain (L), said further chain being free of conjugated double bonds, and (v) a shell comprising said binding chain (ii), said conjugated chain (iii) and said further chain (iv).

Unless otherwise indicated, all numbers or expressions, such as those expressing quantities of ingredients, process conditions, etc., used in the specification and claims are understood as modified in all instances by the term "about."

DETAILED DESCRIPTION OF THE INVENTION

In a preferred embodiment, the organic macromolecular compounds may be oligomers or polymers. In the context of the invention, oligomeric compounds are understood to mean compounds with a molecular weight below 1000 Dalton and polymeric compounds with an average molecular weight of 1000 Dalton and above. The average molecular weight may be the number average ($M_n$) or weight average ($M_w$), depending on the measurement method used. Here, it is the number average ($M_n$).

In the context of the invention, the core-shell structure is a structure on a molecular level, i.e. it relates to the structure of a molecule as such.

The terminal point of linkage of the linear conjugated oligomeric chain is understood to mean the point in the terminal unit of the linear oligomeric chain with conjugated double bonds, via which no further linkage of another takes place. Terminal is understood to mean furthest from the core. The linear oligomeric chain with continuously conjugated double bonds is abbreviated below also to linear conjugated oligomeric chain.

The new compounds preferably have a core-shell structure of the general formula (Z)

in which

K is an n-functional core

V is a binding chain

L is a linear conjugated oligomeric chain,

R stands for linear or branched $C_2$-$C_{20}$-alkyl radicals, mono-or polyunsaturated $C_2$-$C_{20}$-alkenyl radicals, $C_2$-$C_{20}$-alkoxy radicals, $C_2$-$C_{20}$-aralkyl radicals or $C_2$-$C_{20}$-oligo-or $C_2$-$C_{20}$-polyether radicals, n stands for a whole number greater than or equal to 3, preferably greater than or equal to 6.

Here the shell of the preferred new compounds is formed from the n -V-L-R building blocks, which are each linked to the core.

For n equals 3 or 6, for example, these are structures of the formulae (Z-3) or (Z-6)

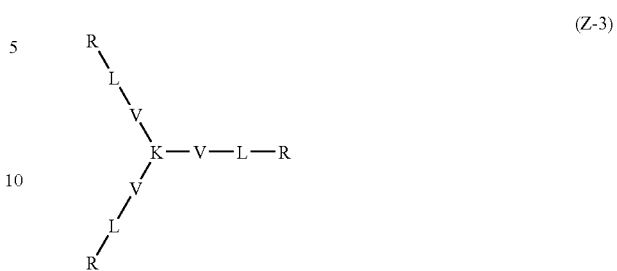

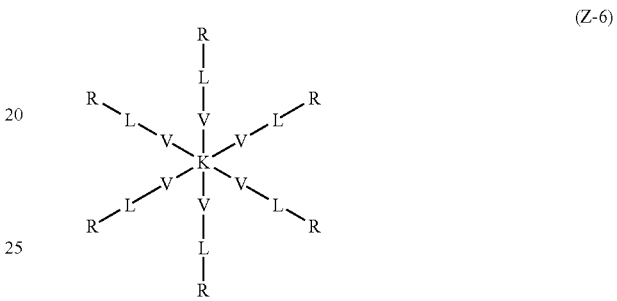

in which K, V, L and R have the meaning given above.

These compounds are constructed in such a way that a core built up of multifunctional units, i.e. branched core, binding chains, linear conjugated oligomeric chains and non-conjugated chains are bound together.

The core built up of multifunctional units preferably has dendritic or hyperbranched structures.

Hyperbranched structures and their production are known per se to the person skilled in the art. Hyperbranched polymers or oligomers have a particular structure, which is predetermined by the structure of the monomers used. So-called ABn monomers are used as monomers, i.e. monomers that have two different functionalities A and B. Of these, one functionality (A) is present only once in each molecule, the other functionality (B) is present several times (n-times). The two functionalities A and B can be reacted with each other, e.g. polymerised, producing a chemical bond. As a result of the monomer structure, branched polymers with a tree-like structure, known as hyperbranched polymers, are produced by polymerisation. Hyperbranched polymers have no regular branch points, no rings and almost exclusively B-functionalities at the chain ends. Hyperbranched polymers, their structure, the question of branching and their nomenclature are described using the example of hyperbranched silicone-based polymers in L. J. Mathias, T. W. Carothers, Adv. Dendritic Macromol. (1995), 2, 101-121 and the works cited therein.

Preferred hyperbranched structures in the context of the invention are hyperbranched polymers.

According to the invention, dendritic structures are synthetic macromolecular structures, which are built up step-by-step by linking in each case 2 or more monomers with each already bound monomer, so that with each step, the number of monomer terminal groups increases exponentially and a spherical dendritic structure is finally formed. In this way, three-dimensional, macromolecular structures are formed with groups, which have branching points and which extend from a centre in a regular manner to the periphery. Such structures are conventionally built up layer by layer by processes known to the person skilled in the art. The number of layers is conventionally known as generation. The number of branches in each layer and also the number of terminal groups increases with the rise in generation. As a result of their regular structure, dendritic structures can offer particular advantages. Dendritic structures, production methods and nomenclature are known to the person skilled in the art and described for example in G. R. Newkome et. al., Dendrimers and Dendrons, Wiley-VCH, Weinheim, 2001.

The structures that can be used in the core built up of dendritic or hyperbranched structures, hereinafter also described as dendritic or hyperbranched core, are for example those disclosed in U.S. Pat. No. 6,025,462. These are, for example, hyperbranched structures such as polyphenylenes, polyetherketones, polyesters such as those disclosed e.g. in U.S. Pat. No. 5,183,862, U.S. Pat. No. 5,225,522 and U.S. Pat. No. 5,270,402, aramides such as those disclosed e.g. in U.S. Pat. No. 5,264,543, polyamides such as those disclosed e.g. in U.S. Pat. No. 5,346,984, polycarbosilanes or polycarbosiloxanes such as those disclosed e.g. in U.S. Pat. No. 6,384,172 or polyarylenes, such as those disclosed e.g. in U.S. Pat. No. 5,070,183 or U.S. Pat. No. 5,145,930, or dendritic structures such as for example polyarylenes, polyarylene ethers or polyamido amines, such as those disclosed e.g. in U.S. Pat. No. 4,435,548 and U.S. Pat. No. 4,507,466, as well as polyethylene imines, such as those disclosed e.g. in U.S. Pat. No. 4,631,337.

However, other structural units can also be used for the construction of the dendritic or hyperbranched core. The role of the dendritic or hyperbranched core is primarily to provide a series of functionalities and thus to form a matrix to which the binding chains with the linear conjugated oligomeric chains can be attached and thus organised in a core-shell structure. The linear conjugated oligomeric chains are pre-orientated by attachment to the matrix and thus increase its effectiveness.

The dendritic or hyperbranched core has a series of functionalities—in the sense of points of linkage—which are suitable for linking the binding chains with the linear conjugated oligomeric chains. In particular, the dendritic core and also the core built up of hyperbranched structures, has at least 3, but preferably at least 6 functionalities.

Preferred structures in the dendritic or hyperbranched core are 1,3,5-phenylene units (formula V-a) and units of the formulae (V-b) to (V-e), several identical or different units of the formulae (V-a) to (V-e) being linked with each other,

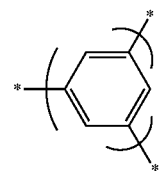
(V-a)

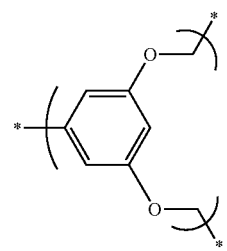
(V-b)

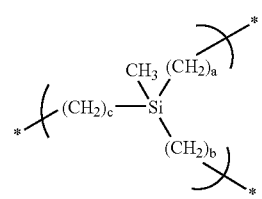
(V-c)

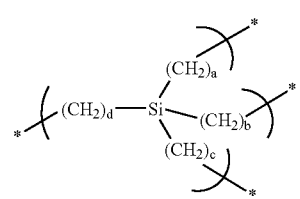
(V-d)

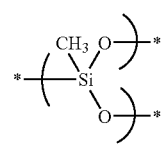
(V-e)

wherein, in the units of formulae (V-c) and (V-d), a, b, c and d, independently of each other, stand for 0, 1, 2 or 3.

The positions identified with * in the formulae (V-a) to (V-e) and in other formulae used below, mark the points of linkage. The units (V-a) to (V-e) are linked to each other via these or to the linear conjugated oligomeric chains (L) via the binding chains.

The following are examples of dendritic cores (K) built up of units of the formula (V-a):

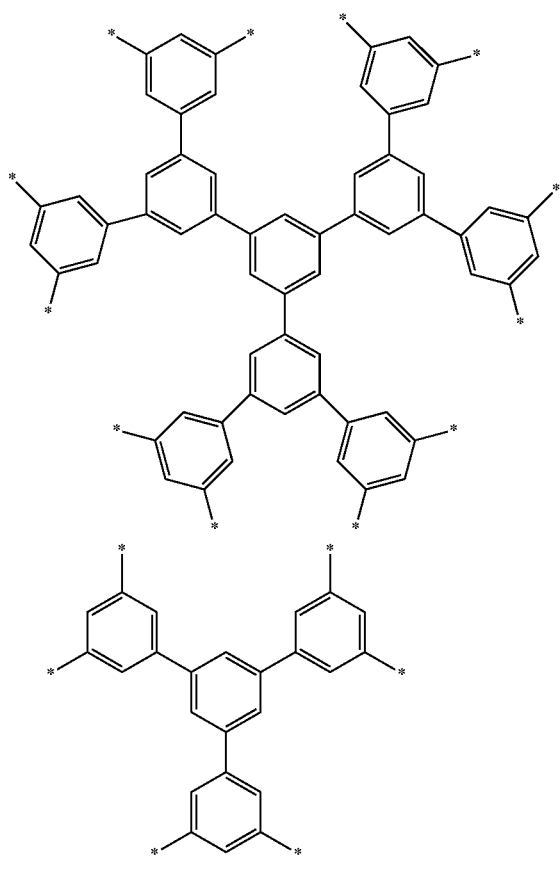

The linkage to the linear conjugated oligomeric chains (L) via the binding chains (V) takes place at the positions identified with *.

The shell of the new compounds is formed from binding chains, linear conjugated oligomeric chains and the non-conjugated chains.

Binding chains (V) are preferably those that are highly flexible, i.e. have a high (intra)-molecular mobility and thereby bring about a geometric organisation of the segments L-R around the core (K). In the context of the invention, flexible is understood to mean having (intra)molecular mobility.

Linear or branched chains having the following structural features are suitable in principle as binding chains:
- carbon atoms bound with carbon atoms by single bonds
- hydrogen atoms bound with carbon
- oxygen atoms bound with carbon by single bonds
- silicon atoms bound with carbon by single bonds and/or
- silicon atoms bound with oxygen by single bonds, which are preferably built up of a total of 6 to 60 atoms and preferably contain no ring structures.

Suitable binding chains are in particular oligoether chains containing linear or branched $C_2$-$C_{20}$-alkylene chains, such as e.g. ethylene-, n-butylene-, n-hexylene-, n-octylene and n-dodecylene chains, linear or branched polyoxyalkylene chains, e.g. —OCH$_2$—, —OCH(CH$_3$)—, or —O—(CH$_2$)$_4$— segments, linear or branched siloxane chains, for example those with dimethylsiloxane structural units and/or straight-chain or branched carbosilane chains, i.e. chains that contain silicon-carbon single bonds, wherein the silicon and carbon atoms in the chains can be organised alternately, statistically or in blocks such as e.g. those with —SiR$_2$—CH$_2$—CH$_2$—CH$_2$—SiR$_2$-structural units.

In principle all chains are suitable as linear conjugated oligomeric chains that have structures that form as such electrically conductive or semiconducting oligomers or polymers. These are for example optionally substituted polyanilines, polythiophenes, polyethylene dioxythiophenes, polyphenylenes, polypyrrols, polyacetylenes, polyisonaphthenes, polyphenylenevinylenes, polyfluorenes, which may be used as homopolymers or -oligomers or as copolymers or -oligomers. Examples of such structures, which can preferably be used as linear conjugated oligomeric chains, are chains of 2 to 10, particularly preferably 2 to 7 units of the general formulae (VI-a) to (VI-e),

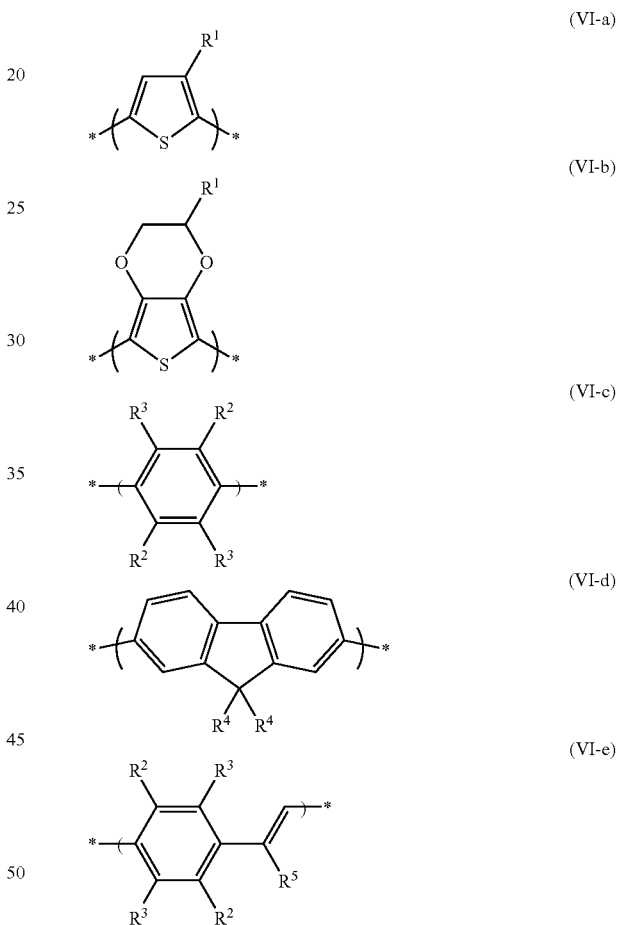

wherein,
$R^1$, $R^2$ and $R^3$ may be the same or different and stand for hydrogen, straight-chain or branched $C_1$-$C_{20}$-alkyl- or $C_1$-$C_{20}$-alkoxy groups, are preferably the same and preferably stand for hydrogen, $R^4$ may be the same or different and stands for hydrogen, straight-chain or branched $C_1$-$C_{20}$-alkyl groups or $C_1$-$C_{20}$-alkoxy groups, preferably stands for hydrogen or $C_6$-$C_{12}$-alkyl groups and $R^5$ stands for hydrogen or a methyl-or ethyl group, preferably for hydrogen.

The positions of formulae (VI-a) to (VI-e) identified with * mark the points of linkage, via which the units (VI-a) to (VI-e)

are linked together to form the linear conjugated oligomeric chain or are linked to the respective chain ends on the core or carry the non-conjugated chain.

Linear conjugated oligomeric chains with units of optionally substituted 2,5-thiophenes (VI-a) or (VI-b) or optionally substituted 1,4-phenylenes (VI-c) are particularly preferably contained. The preceding FIGS. 2,5- or 1,4- indicate the positions in the units via which the linkage takes place.

Here and below substituted means a substitution with alkyl groups, in particular with $C_1$-$C_{20}$ alkyl groups or with alkoxy groups, in particular with $C_1$-$C_{20}$ alkoxy groups if not otherwise indicated.

Linear conjugated oligomeric chains with units of unsubstituted 2,5-thiophenes (VI-a) or 2,5-(3,4-ethylenedioxythiophenes) (VI-b) are most particularly preferred.

The linear conjugated oligomeric chains, designated L in the general formula (Z), are each saturated at the terminal point of linkage by a non-conjugated chain (R). Non-conjugated chains are preferably those that are highly flexible i.e. have high (intra)molecular mobility, thereby interacting well with solvent molecules and thus producing improved solubility. Flexible in the context of the invention is understood to mean having (intra)molecular mobility. The non-conjugated chains, which carry the linear conjugated oligomeric chains at the terminal point of linkage, are optionally straight-chain or branched aliphatic, unsaturated or araliphatic chains interrupted by oxygen, having 2 to 20 carbon atoms, preferably having 6 to 20 carbon atoms. Aliphatic and oxyaliphatic groups, i.e. alkoxy groups or straight-chain or branched aliphatic groups interrupted by oxygen, such as oligo- or polyether groups, are preferred. Unbranched $C_2$-$C_{20}$-alkyl- or $C_2$-$C_{20}$-alkoxy groups are particularly preferred. Examples of suitable chains are alkyl groups such as n-hexyl, n-heptyl, n-octyl, n-nonyl, n-decyl and n-dodecyl groups as well as alkoxy groups such as n-hexyloxy, n-heptyloxy-, n-octyloxy-, n-nonyloxy-, n-decyloxy-and n-dodecyloxy groups.

Structural elements of the general formula (VI-a-R) and (VI-b-R):

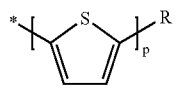
(VI-a-R)

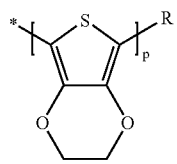
(VI-b-R)

in which R has the meaning given above for the general formula (Z) and

ρ is a whole number from 2 to 10, preferably from 2 to 7, are given as examples of structural elements L-R of a with linear conjugated oligomeric chains, which are each saturated at the terminal point of linkage by a non-conjugated chain.

Preferred embodiments of the present invention are compounds with structures that contain in the dendritic core siloxane- and/or carbosilane units, as the binding chain linear, unbranched alkylene groups, as linear conjugated oligomeric chains unsubstituted oligothiophene chains and oligo(3,4-ethylenedioxythiophene) chains with 2 to 4 thiophene- or 3,4-ethylenedioxythiophene units and also $C_6$-$C_{12}$-alkyl groups as flexible non-conjugated chains.

The following compounds of the formulae (Z-4-a) and (Z-X-a) are given as examples of these:

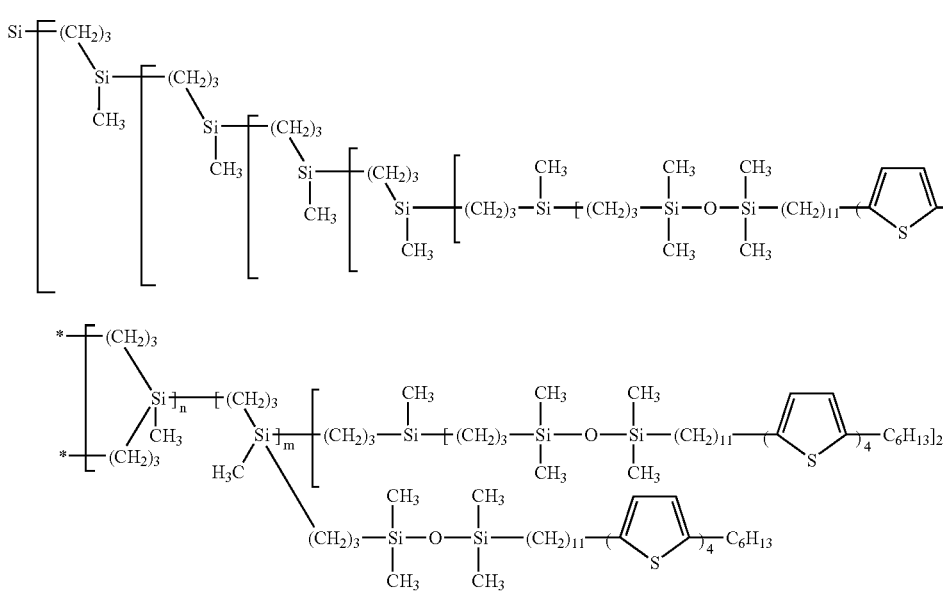

wherein in (Z-X-a) n, m and p may be the same or different and, independently of each other, stand for a whole number from 1 to 100, preferably 3 to 20, particularly preferably 4 to 12. In preferred embodiments of the compounds according to the invention, at least two of the variables n, m and p are the same, in most particularly preferred embodiments n, m and p are the same.

The new compounds are preferably conductive or semi-conducting. The invention particularly preferably provides those compounds that are semiconducting. Those compounds having a mobility for charge carriers of at least $10^{-4}$ cm$^2$/Vs are particularly preferred. Charge carries are e.g. positive hole charges.

The macromolecular compounds according to the invention are typically readily soluble in common solvents such as for example chloroform, toluene, benzene, diethylether, dichloromethane or tetrahydrofuran and thus extremely suitable for processing from solution. It is particularly surprising, that even special, new compounds with unsubstituted thiophene- or 3,4-ethylenedioxythiophene units in the linear conjugated oligomeric chains have very good solubility without the internal orientation or morphology being disturbed by sterically demanding side chains. Accordingly, the new compounds possess good semiconducting and also excellent film-forming properties. They are thus highly suitable for the coating of large areas. The semiconducting compounds according to the invention also have excellent thermal stability and good ageing behaviour.

The compounds according to the invention also have the advantage in comparison with the known semiconducting dendrimers from EP-A 1 398 341 for example, that the increased flexibility obtained from the additional binding chains in the shell allows a higher orientation to be achieved in semiconducting layers containing the compounds according to the invention. This can have positive effects on the properties of the end product.

In principle, different methods can be used for the production of the compounds according to the invention.

For example, the structural elements V-L-R can first be produced and then linked to the core (K). However, a finished structural element V-L-R or a partial structure of this, in the case of a dendritic core for example, can first be linked to a building block called a monodendron and several of these monodendrons can be joined together in the next step to form the final structure. A monodendron is a building block that contains part of the dendritic structure and can be joined together to form a dendritic structure.

In principle, the production method has no significant influence on the properties of the compounds according to the invention. A range of variants is possible within the production methods described. Thus for example, it is possible to change the sequence of the individual production steps and for example to link the non-conjugated flexible chains to the linear conjugated oligomeric chains as the final production step.

Depending on the structure to be produced, it may be useful for example, to link the non-conjugated flexible chains (R) to the linear conjugated oligomeric chains (L) at an earlier stage, as the flexible chains (R) increase the solubility of the building blocks and thus facilitate the production of the compounds according to the invention.

A range of chemical reactions is available for the construction of the core built up of multifunctional units, for its linkage with the binding chains (V), for the linkage of the binding chains (V) with the linear conjugated oligomeric chains (L) and for the linkage of the non-conjugated flexible chains (R) with these, and these are known in principle to the person skilled in the art. As chemical reactions, metalorganic reactions are preferably carried out. These have the advantage that they generally proceed under mild reaction conditions with high selectivity and in this case high reaction yields are achieved.

It is also possible to produce the compounds according to the invention in such a way that the individual structural units K, V, L and R are first formed for the linkages and these are then present only as partial structures or in functionality form in the starting compounds that are reacted with each other. Thus for example, a linear oligomeric chain (L) can first be formed by joining together two chain building blocks optionally functionality for linkage. With this procedure for the construction of the compounds according to the invention, metalorganic reactions are also carried out as the preferred chemical reactions.

The invention thus further provides a process for the production of the compounds according to the invention, characterised in that they are produced by metalorganic reactions.

For metalorganic reactions, it is optionally necessary to incorporate corresponding functionalities into the dendritic or hyperbranched core, the binding chains, the linear conjugated oligomeric chains and the flexible non-conjugated chains and then to link these with each other.

Such functionalities are for example, alkenyl groups, halogen groups, for example chlorine, bromine and iodine groups, preferably bromine groups, tin-organic groupings such as e.g. the trimethyl- or triethyltin group, silicon-organic groupings such as e.g. the trimethylsilane- or triethylsilane group or boron-organic groupings such as e.g. boron acids.

Particularly preferred metalorganic reactions for coupling the individual components of the compounds according to the invention are Kumada coupling, in which two bromine groups are coupled through Grignard compounds using palladium catalysts such as e.g. 1,1-bis-(diphenylphosphino)ferrocene dichloropalladium(II), and Suzuki coupling, in which boron-containing groups are coupled basically with bromine groups using palladium catalysts. The method of both coupling reactions is known to the persons skilled in the art. Hydrosilylation of alkenyl groups is also a preferred metalorganic reaction for linking individual building blocks for the production of the compounds according to the invention. The method of hydrosilylation is also known to the person skilled in the art.

Examples of embodiments of the process according to the invention are described in the examples.

The intermediate stages between the individual production steps and the final compound are preferably purified. This can be done by the known methods of distillation, sublimation, recrystallisation, extraction, reprecipitation, washing or chromatography. Intermediate stages and final compounds are preferably purified by distillation, sublimation and chromatography, as these methods produce the highest purities This offers the advantage over the known semiconducting polymers, that the compounds according to the invention can be produced in high purities by means of simple, common, purification processes and are thus suitable for use in semiconductor technology.

The compounds according to the invention can form mesophases (mesomorphic phases) i.e. physical phases between the solid and the liquid state. These are also called liquid-crystalline phases and support pre-orientation of the compounds according to the invention. The compounds according to the invention preferably form liquid-crystalline phases in the range of 50° C. to 300° C., most preferably of 80° C. to 180° C.

The compounds according to the invention are at least 0.1%, preferably at least 1%, particularly preferably at least 5% soluble in conventional solvents e.g. in chloroform, toluene, benzene, diethylether, dichloromethane and tetrahydrofuran.

The compounds according to the invention form high-quality layers of uniform thickness and morphology from evaporated solutions and are thus suitable for electronic applications.

The invention finally further provides the use of the compounds according to the invention as semiconductors in electronic structural elements such as field effect transistors, light-emitting structural elements, such as organic light-emitting diodes or photovoltaic cells, lasers and sensors.

The compounds according to the invention are preferably used in the form of layers for these purposes.

To usefully ensure functionality as a semiconductor, the compounds according to the invention have sufficient mobility, e.g. at least $10^{-4}$ cm$^2$/Vs. Charge mobilities can be determined for example as described in M. Pope and C. E. Swenberg, Electronic Processes in Organic Crystals and Polymers, $2^{nd}$ ed., p. 709-713 (Oxford University Press, New York Oxford, 1999).

To use the compounds according to the invention, they are applied to suitable substrates, for example to silicon wafers, polymer films or glass sheets provided with electrical or electronic structures. All application processes are in principle possible for application. The compounds according to the invention are preferably applied from the liquid phase, i.e. in solution and the solvent is then evaporated.

Application from solution can be carried out by the known processes, for example by spraying, dipping, printing and spin-coating. Application by spin coating and Ink Jet coating is particularly preferred.

The layers of the compounds according to the invention can be further modified after application, for example by thermal treatment e.g. passing through a liquid-crystalline phase or for structuring, e.g. by laser ablation.

The invention further provides electronic structural elements containing the compounds according to the invention as semiconductors.

EXAMPLES 5-(10-undecenyl)-2,2'-bithiophene was produced by known processes (Synthesis, 1993, p. 1099, J. Mater. Chem. 2003, Volume 13, p. 197). The synthesis of the carbosilane dendrimer G5(A11)128 (see example 2A) and the hyper-branched carbosilane polymer Si-Hyper-Allyl (see example 2B) is described in Polym. Sci. Ser. A, 1998, Volume 40, p. 763 and J. Polym. Sci., Part A, 2000, Volume 38 p. 741. All reaction vessels were thoroughly heated and flooded with nitrogen before use, according to the conventional protective gas method.

Example 1

Production of a Compound with a V-L-R Structure

Example 1A

Production of 4,4,5,5-tetramethyl-2-[5'-(10-undecenyl)-2,2'-bithien-5-yl]-1,3,2-dioxaborolane (Und-2T-Bor)

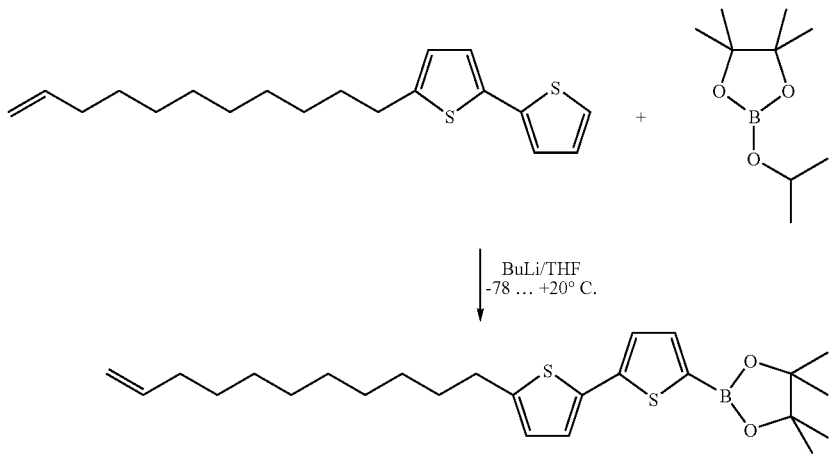

100 ml anhydrous tetrahydrofuran was cooled with dry ice/acetone to −75° C. in a dry, nitrogen-filled 500 ml flask with a mechanical stirrer. 6.4 ml 2.5 m butyl lithium solution in hexane was then added drop-by-drop and this was then stirred for 20 minutes. A solution of 5-undecenyl-2,2-bithiophene (5.10 g, 16.0 mmol) in 120 ml anhydrous tetrahydrofuran was then added drop-by-drop over 1.5 h and this was then stirred for 30 min at −75° C. This was then heated to 0° C. over 1 h and the clear yellow solution was then cooled again to −75° C. 3.91 g isopropoxydioxaborolane was then added in batches in such a way that the temperature of the solution did not rise above −72° C. and once this had all been added, it was stirred for 30 min at −72° C. Stirring continued, the cooling bath was removed and the reaction mixture slowly warmed up. After 3 h the reaction mixture was added to 500 ml diethylether, and then to a mixture of 200 ml ice-cold water and 16 ml 1N hydrochloric acid, shaken and the phases were separated. The organic phase was washed twice with 200 ml water each time, dried with anhydrous sodium sulfate, filtered and the solvent was removed. 7.35 g of blue solid was obtained as the product.

$^1$H NMR (CDCl$_3$, TMS/ppm): 1.22-1.45 (overlapping peaks with a maximum at 1.283, 14H), 1.345 (s, 12 H), 1.672 (m, J=7.5 Hz, M=5, 2H), 2.037 (q, J=7.2 Hz, 2H), 2.781 (t, J=7.3 Hz, 2H), 4.928 (d, J=10.3 Hz, 1H), 4.991 (d, J=17.1 Hz, 1H), 5.811 (m, 1H), 6.676 (d, J=3.4 Hz, 1H), 7.037 (d, J=3.9 Hz, 1H), 7.152 (d, J=3.9 Hz, 1H), 7.496 (d, J=3.4 Hz, 1H).

Example 1B

Production of 5-hexyl-5'''-undec-10-en-1-yl-2,2':5', 2":5",2'''-quaterthiophene (Und-4T-Hex)

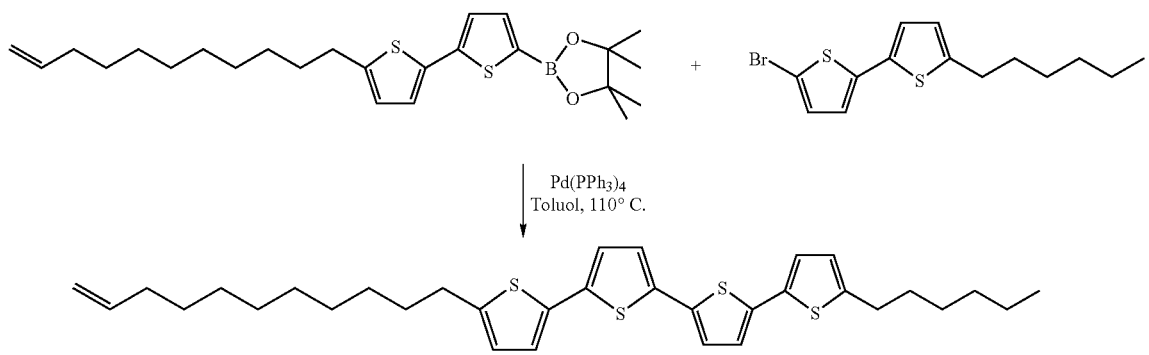

4.61 g 2-hexyl-5-bromobithiophene was provided in a dry, nitrogen-filled apparatus consisting of a 250 ml three-neck flask with a magnetic stirrer, reflux condenser and septum intake, saturated with nitrogen and 0.090 g tetrakis-(triphenylphosphino)-palladium was added under nitrogen. A solution of 7.35 g of the compound from example 1A, 120 ml toluene under nitrogen and 21 ml of a 2 M sodium carbonate solution under nitrogen were added one after the other by injection through the septum and refluxed overnight. After cooling, the reaction mixture was added to 200 ml ice-cold water, 45 ml 1 N hydrochloric acid and 300 ml toluene, shaken and washed twice with 200 ml water. The yellow deposit formed was filtered off, dissolved in 350 ml toluene, dried over magnesium sulfate, filtered and the solvent was removed. 1.28 g yellow solid was obtained (Und-4T-Hex)[1].

The organic liquid phase was dried over magnesium sulfate, filtered, the solvent was removed and the residue was recrystallised from 900 ml n-hexane. 5.8 g brownish yellow solid was obtained (Und-4T-Hex)[2]. After recrystallisation from toluene had been repeated, 4.81 g of the yellow powder that, according to analysis, consisted of (Und-4T-Hex) and triphenylphosphine was obtained. Yield: 1.28+4.81=6.09 g (77% of theoretical)

MS (Und-4T-Hex)1: M/z=566 (M.+)+ traces of 582 and 634.

$^1$H NMR ((Und-4T-Hex)[1], CDCl$_3$, TMS/ppm): 0.896 (t, J=6.9, 3H), 1.23-1.44 (overlapping peaks with a maximum at 1.289, 18 h), 1.682 (m, J=7.3, M=5, 4H), 2.040 (q, J=7.0, 2H), 2.791 (t, J=7.6, 4H), 2.840 (q, J=7.2, 2H), 4.931 (d, J=9.8, 1H), 4.989 (d, J=17.1, 1H), 5.814 (m, 1H), 6.681 (d, J=3.9, 2H), 6.975 (d, J=3.4, 2H), 6.988 (d, J=3.9, 2H), 7.029 (d, J=3.9, 2H).

Example 1C

Production of 1-[11-(5'''-hexyl-2,2':5',2":5",2'''-quaterthien-5-yl)undecyl]-1,1,3,3-tetramethyldisiloxane (HSi-Und-4T-Hex)

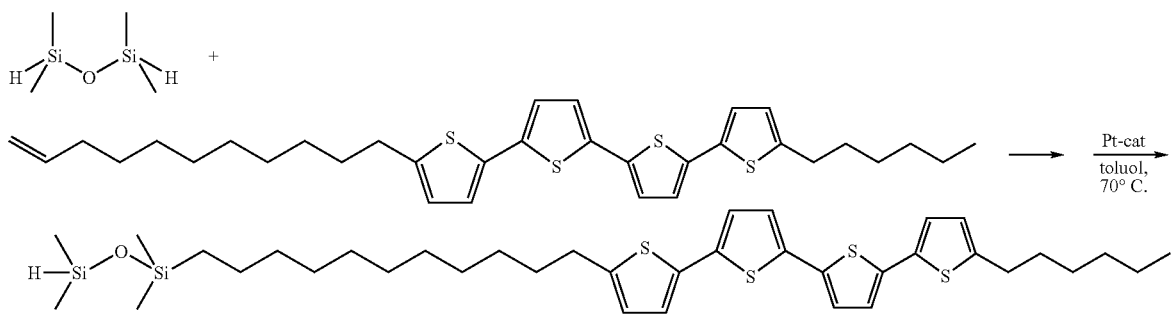

1.25 g of the compound from example 1B (Und-4T-Hex) and 40 ml anhydrous toluene were provided in a dry, nitrogen-filled 250 ml three-neck flask with a magnetic stirrer, reflux condenser, nitrogen intake and thermometer, the solution was saturated with nitrogen and heated to 70° C. 16 ml (12.0 g) tetramethylsiloxane and 10 μl platinum-cyclovinylmethylsiloxane complex in cyclomethylvinylsiloxanes with 3-3.5% Pt) (ABCR, Karlsruhe) was added to the clear solution and stirred for 21 hours. After removing the solvent, 2.59 g of yellow solid was obtained, which was chromatographed dissolved in hot toluene at 50° C. on silica gel. 1.365 g (87% of theoretical) of yellow solid was obtained.

FD MS: main peak at M/z=700 (M.+), smaller quantities of M/z=566 and traces of M/z=714, 774 and 903.

$^1$H NMR (CDCl$_3$, TMS/ppm): 0.056 (s, 6H), 0.160 (d, J=2.5 Hz, 6H), 0.526 (t, J=7.6 Hz, 2H), 0.896 (t, J=6.85, 3H), 1.21-1.44 (overlapping peaks with a maximum at 1.268, 22 H), 1.681 (m, J=7.5, M=5, 4H), 2.789 (t, J=7.6 Hz, 4H), 4.676 (m, J=2.8 Hz, M=7, 1H), 6.680 (d, J=3.9, 2H), 6.974 (d, J=3.4, 2H), 6.987 (d, J=3.9, 2H), 7.028 (d, J=3.4, 2H).

Example 2

Production of Compounds According to the Invention with a K-(V-L-R)$_n$ Structure Example 2A Production of a Compound According to the Invention with a K-(V-L-R)$_n$ Structure and a Dendritic Core 702 mg (1.0 mmol) of the compound from example 1C (HSi-Und-4T-Hex) was saturated with nitrogen in a dry and nitrogen-filled 100 ml three-neck flask with a magnetic stirrer, reflux condenser, nitrogen intake and thermometer, and 1.3 ml (82 mg solid) of a solution of G5(A11)128 dendrimer was added. The solvent was removed in a vacuum, the flask was filled with nitrogen, 17 ml anhydrous toluene was added and the solution was saturated with nitrogen. The mixture was heated to 60° C., 10 µl platinum-divinyltetramethylsiloxane complex in xylene (ABCR, Karsruhe) with 2-2.4% Pt was added to the clear solution and the solution was heated to 80° C. for 20 h. 70 ml ethanol was then added, this was refluxed for 4 h, the suspension formed was hot-filtered and the filter residue was dried in a high vacuum (625 mg yellow solid, (Z-4-a)$^1$). The solvent was removed from the filtrate (216 mg residue).

(Z-4-a)$^1$ was dissolved in 15 ml toluene at 80° C. and 70 ml ethanol was added drop-by-drop. A suspension formed and was filtered. The filter residue was dried in a high vacuum and

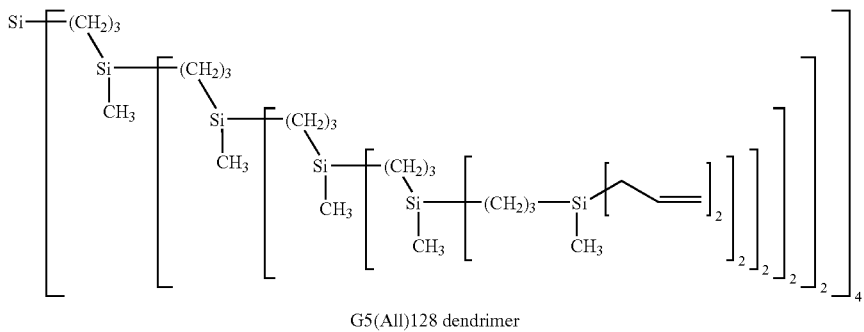

G5(All)128 dendrimer

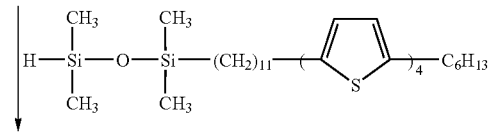

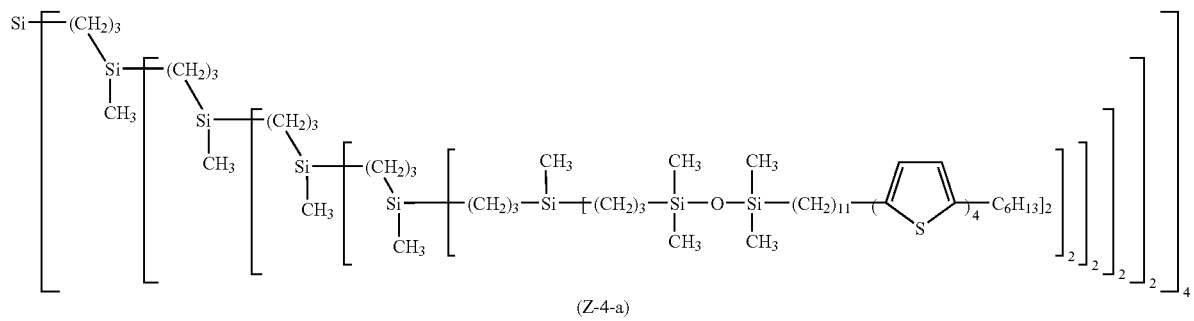

(Z-4-a)

the solvent was removed from the filtrate. This procedure was repeated twice. 486 mg (92% of theoretical) of yellow solid (Z-4-a)² was obtained.

Example 2B

Production of a Compound According to the Invention with a K-(V-L-R)$_n$ Structure and a Hyperbranched Core

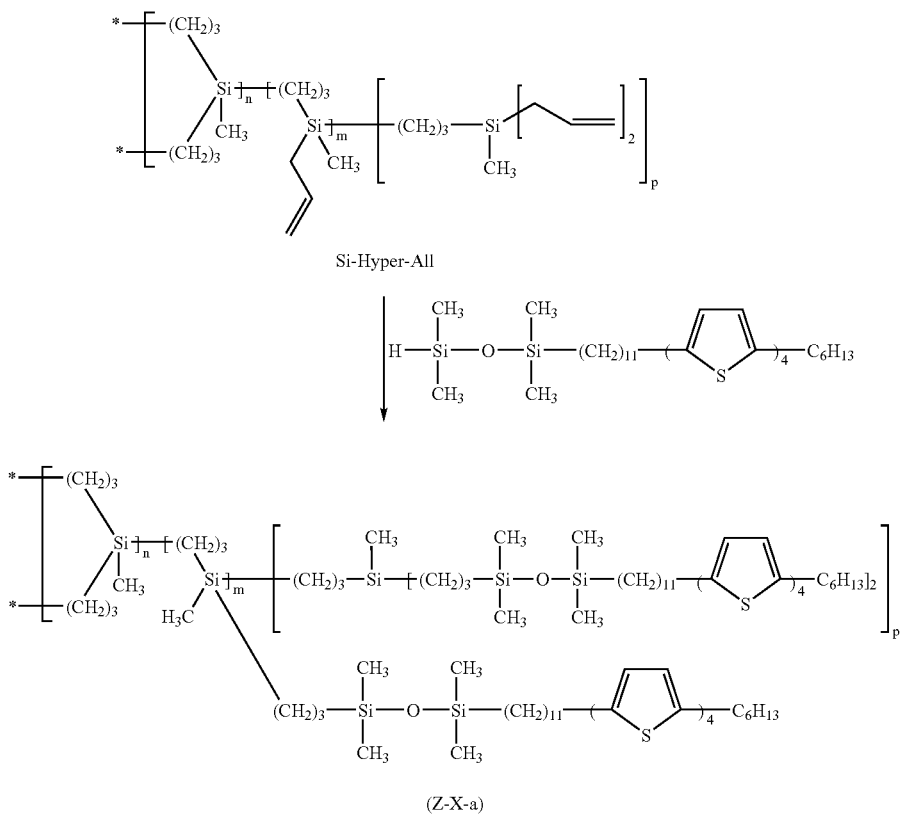

where $M_n$=11800 and $M_w$=28400 and wherein n, m, p vary in the range of 1 to 100.

The empirical formula of the starting compounds (Si-Hyper-All) generally corresponds to:

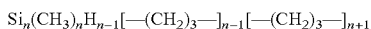

As described in example 2A, 631 mg of the compound from example 1C (HSi-Und-4T-Hex, 0.9 mmol), 76 mg of the hyperbranched polymer Si-Hyper-Allyl (76 mg, 0.6 mmol allyl groups) and 10 µl platinum-divinyltetramethylsiloxane-complex in xylene with 2-2.4% Pt (ABCR, Karlsruhe) were reacted in 15 ml anhydrous toluene and isolated. Yield: 465 mg (94% of theoretical) of the compound (Z-X-a).

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A macromolecular compound, having a core-shell structure, comprising,
   (i) a core comprising a macromolecular base structure comprising atoms selected from the group consisting of silicon and carbon and combinations thereof, said core being bound to at least 3 outer groups by means of, for each outer group,
   (ii) a binding chain based on carbon, each binding chain being bound to said core and also being bound to
   (iii) a first end of a conjugated chain (L) comprising a linear carbon-based oligomeric chain having continuously conjugated double bonds,
   (iv) a further chain that is bound to an end of said conjugated chain (L) that is opposite of said first end of said conjugated chain (L), said further chain being free of conjugated double bonds, and
   (v) a shell comprising said binding chain (ii), said conjugated chain (iii) and said further chain (iv).

2. The compound of claim 1 wherein said compound has a core-shell structure represented by the following general formula (Z), $$K\text{-}(V\text{-}L\text{-}R)_n \qquad (Z)$$

wherein
K represents said core, said core being n-functional,
V represents said binding chain,
L represents said linear conjugated oligomeric chain,
R represents said further chain, and is selected from the group consisting of linear or branched $C_2$-$C_{20}$-alkyl radicals, mono- unsaturated $C_2$-$C_{20}$-alkenyl radicals, poly-unsaturated $C_2$-$C_{20}$-alkenyl radicals, $C_2$-$C_{20}$-alkoxy radicals, $C_2$-$C_{20}$-aralkyl radicals, $C_2$-$C_{20}$-oligo-ether radicals and $C_2$-$C_{20}$-poly-ether radicals, and n is a whole number greater than or equal to 3.

3. The macromolecular compound of claim 1 wherein said core has a dendritic structure.

4. The macromolecular compound of claim 3 wherein said dendritic structure of said core comprises 1,3,5-phenylene units.

5. The macromolecular compound of claim 1 wherein said core has a hyperbranched structure.

6. The macromolecular compound of claim 5 wherein said hyperbranched structure of said core comprises a hyperbranched polymer.

7. The macromolecular compound of claim 1 wherein said linear carbon-based oligomeric chain of said conjugated chain of said shell comprises units selected from the group consisting of 2,5-thiophenes, substituted 2,5-thiophenes, 1,4-phenylenes, substituted 1,4-phenylenes and combinations thereof.

8. The macromolecular compound of claim 7 wherein said linear carbon-based oligomeric chain of said conjugated chain of said shell comprises units selected from the group consisting of unsubstituted 2,5-thiophenes, 2,5-(3,4-ethyl-enedioxythiophenes) and combinations thereof.

9. The macromolecular compound of claim 7 wherein the linear conjugated oligomeric chains comprise a chain length of 2 to 7 monomeric units.

10. The macromolecular compound of claim 1 wherein each of said further chain comprises a member selected independently from the group consisting of linear or branched alkyl groups, linear or branched alkoxy groups and combinations thereof.

11. The macromolecular compound of claim 10 wherein the alkyl groups are selected from linear $C_2$-$C_{20}$-alkyl groups, and the alkoxy groups are selected from linear C2-$C_{20}$-alkoxy groups.

12. The macromolecular compound of claim 11 wherein the linear C2-$C_{20}$-alkyl groups are selected from the group consisting of n-hexyl, n-decyl and n-dodecyl groups, and the linear $C_2$-$C_{20}$-alkoxy groups are selected from the group consisting of n-hexoxy, n-decoxy and n-dodecoxy groups.

13. The macromolecular compound of claim 1 wherein each binding chain is selected independently from the group consisting of linear or branched $C_2$-$C_{20}$-alkylene chains, linear or branched polyoxyalkylene chains and linear or branched siloxane chains.

14. The macromolecular compound of claim 1 wherein said macromolecular compound is a semiconducting macromolecular compound.

15. The macromolecular compound of claim 14 wherein said macromolecular compound has a mobility for charge carriers of at least $10^{-4}$ cm$^2$/Vs.

16. A process for producing the macromolecular compound of claim 1 comprising performing metalorganic reactions.

17. The process of claim 16 wherein the metalorganic reactions are Kumada coupling reactions.

18. The process of claim 16 wherein the metalorganic reactions are Suzuki coupling reactions.

19. An electronic structural element comprising a semiconductor material, wherein said semiconductor material comprises the macromolecular compound of claim 1.

20. The electronic structural element of claim 19 wherein said electronic structural element is selected from the group consisting of field effect transistors, light-emitting structural elements, photovoltaic cells, lasers and sensors.

21. The electronic structural element of claim 19 wherein said semiconductor material comprises at least one layer comprising the macromolecular compound, said layer being formed by applying a composition comprising said macromolecular compound to at least a portion of said electronic structural element.

* * * * *

UNITED STATES PATENT AND TRADEMARK OFFICE
CERTIFICATE OF CORRECTION

PATENT NO. : 7,402,651 B2  
APPLICATION NO. : 11/088434  
DATED : July 22, 2008  
INVENTOR(S) : Kirchmeyer et al.

Page 1 of 1

It is certified that error appears in the above-identified patent and that said Letters Patent is hereby corrected as shown below:

In the Specification

Column 18, line 3, "(M.+)" should read -- (M·+) --

In the Claims

Column 23, line 37, "C2" should read -- $C_2$ --

Column 24, line 2, "C2" should read -- $C_2$ --

Signed and Sealed this  
Eleventh Day of February, 2014

Michelle K. Lee  
*Deputy Director of the United States Patent and Trademark Office*